J. M. EADIE.
STEERING AND TURNING DEVICE FOR VEHICLES.
APPLICATION FILED JUNE 11, 1907.
922,757.
Patented May 25, 1909.
2 SHEETS—SHEET 1.
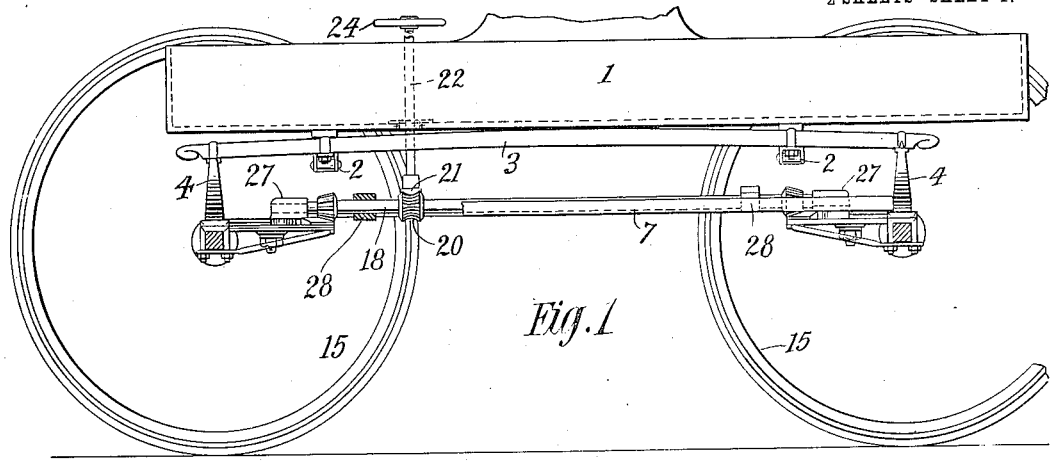
*Fig.1*
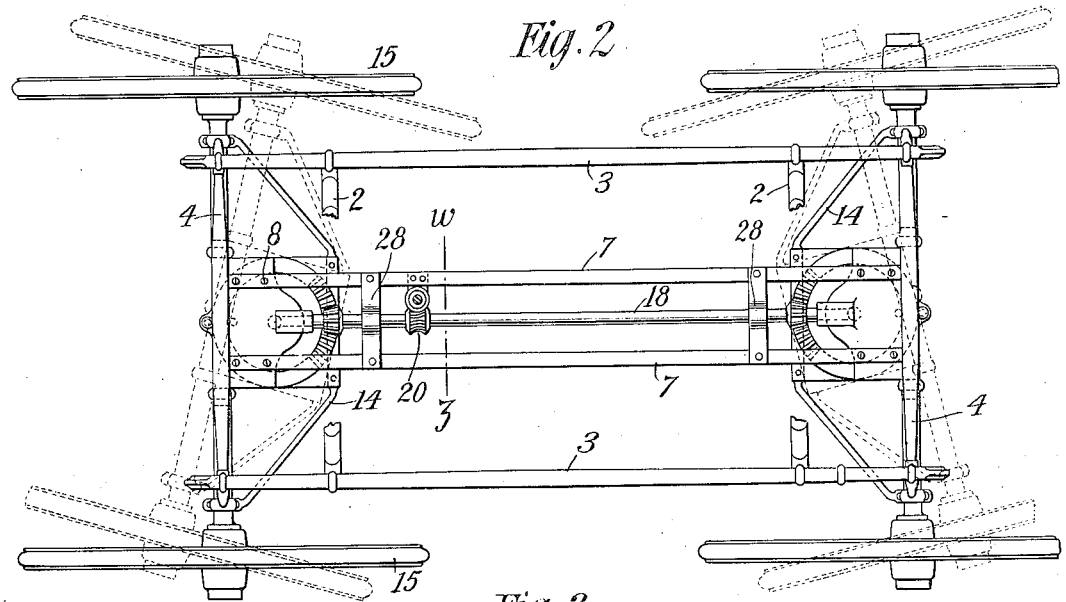
*Fig.2*
*Fig.3*
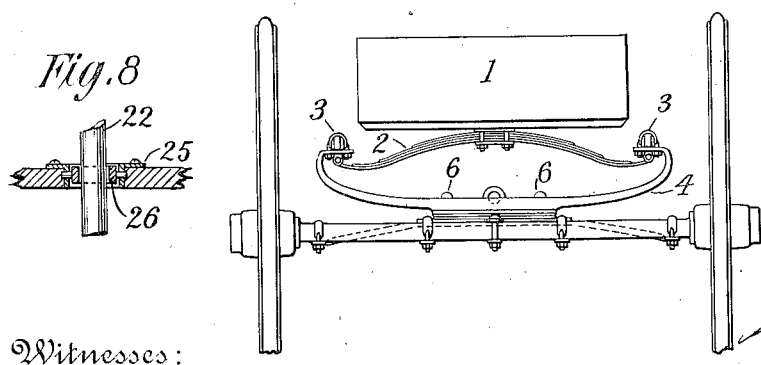
*Fig.8*
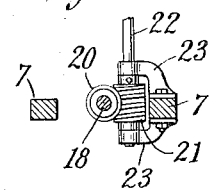
*Fig.7*
Witnesses:
Raphaël Ketter
James K Lee
John M. Eadie
Inventor
By his Attorney J. M. EADIE.
STEERING AND TURNING DEVICE FOR VEHICLES.
APPLICATION FILED JUNE 11, 1907.
922,757.
Patented May 25, 1909.
2 SHEETS—SHEET 2.
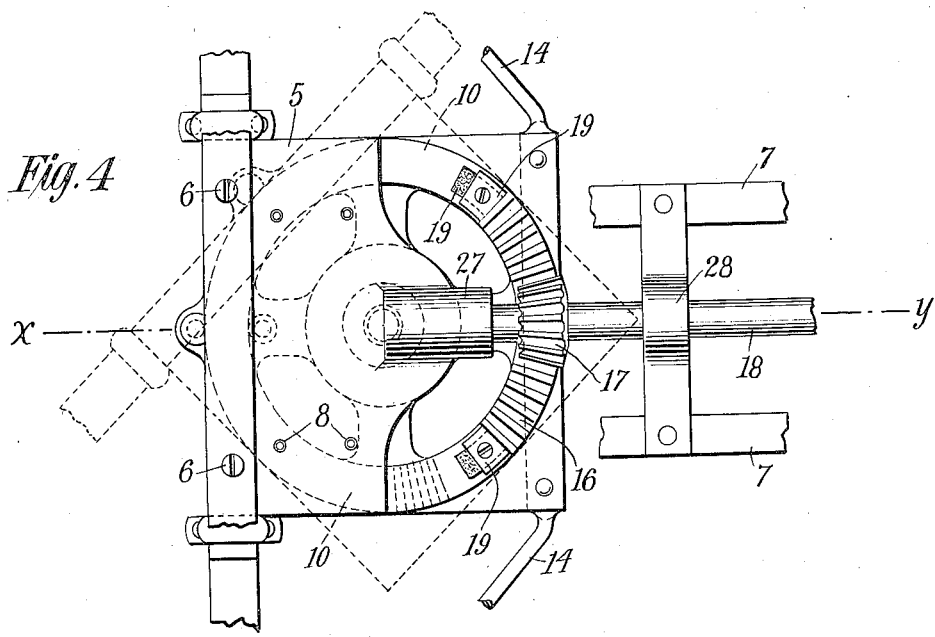
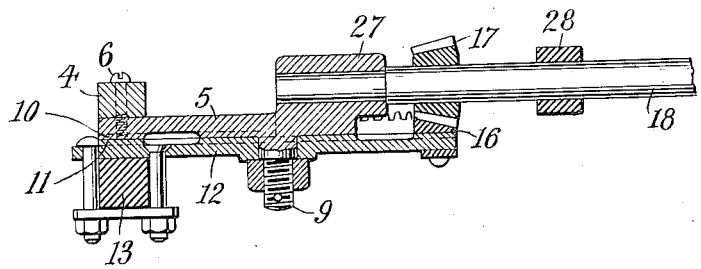
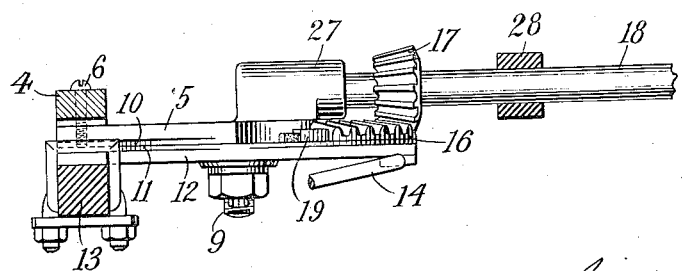

UNITED STATES PATENT OFFICE.

JOHN M. EADIE, OF NEW YORK, N. Y., ASSIGNOR TO EADIE VEHICLE GEAR COMPANY, A CORPORATION OF NEW JERSEY.

STEERING AND TURNING DEVICE FOR VEHICLES.

No. 922,757.  Specification of Letters Patent.  Patented May 25, 1909.

Application filed June 11, 1907. Serial No. 378,422.

*To all whom it may concern:*

Be it known that I, JOHN M. EADIE, a citizen of Great Britain, formerly residing in Toronto, Canada, and now residing in the borough of Manhattan, city, county, and State of New York, have invented certain new and useful Improvements in Steering and Turning Devices for Vehicles, of which the following is a specification.

My invention relates to short turn running gears for vehicles wherein two fifth wheels are employed, one for each axle, and wherein the king bolts of each fifth wheel are placed at a distance from the axle toward the middle of the vehicle body to enable the vehicle to be turned on a shorter curve than where the king bolts are placed immediately over the axle; and wherein by suitable mechanism connecting the parts the turning of one axle controls or compels the turning of the other axle. And my invention consists in the novel construction and arrangement of the said fifth wheels with their king bolts and of the racks, pinions and connecting shaft, and also of a frame, which I employ for mounting the vehicle body in place, all of which are herein fully described.

My invention consists also in the addition to these parts of a steering device with its connections by which both axles may be turned at the same time from within the vehicle.

My invention also consists in several other combinations and constructions herein described and claimed.

In the drawings which form part of this specification, Figure 1 is a side elevation of a vehicle showing my improved steering and turning devices, one cross spring at each axle being shown supporting part of the vehicle body. Fig. 2 is a plan view of the same, the body of the vehicle having been removed for convenience in illustration. Fig. 3 is an end view of the parts shown at the left of Fig. 2. Fig. 4 is an enlarged detailed view showing the fifth wheel construction and connecting parts, which I employ for both the axles, parts of the reaches having been cut away for clearness in illustration. Fig. 5 is a cross section through the line X—Y of the parts shown in Fig. 4, the reaches having been omitted for clearness in illustration. Fig. 6 is a side view of the parts shown in Fig. 4. Fig. 7 shows parts of the steering device on the line W—Z of Fig. 2. Fig. 8 shows in section the means which I employ to guard the controller rod where the same passes through the floor of the vehicle.

Referring now to Figs. 1–6—1 is a vehicle body. 2 2 the cross springs on which it rests. 3 3 are the side bars. 4 4 are the perches or head blocks. 5 5 are two horizontal plates to which perches 4 4 are secured by bolts 6 6 as shown. 7 7 are longitudinal reaches fastened to horizontal plates 5 5 by screws or rivets 8 8. These parts namely plates 5 5 and reaches 7 7 constitute a horizontal longitudinal frame on which the body of the vehicle is supported by means of the springs and side bars. The springs and side bars are constructed and connected in the ordinary manner.

Obviously my device may be applied to a vehicle wherein no springs are employed, in which case the vehicle body will be suitably supported on the longitudinal frame, composed of plates 5 5 and reaches 7 7. So obviously other forms of construction than the cross springs here shown may be employed suitably attached to plates 5 5 by head blocks or otherwise, or I may dispense with the reaches 7 7 and support the body of the vehicle by other suitable means upon plates 5 5. Said plates 5 5 support the upper section 10 10 of each fifth wheel. They extend inward toward the middle of the vehicle body for accommodation of the king bolts 9 9. In this illustration of my device I have made the king bolts 9 9 in one casting with the plates 5 5. Obviously, however, proper bearing for the king bolts 9 9 in said plates 5 5 may be provided without departing from the spirit of my invention. The upper section 10 10 of the fifth wheels shown in cross section in Fig. 5, forms a segmental track or bearing surface, and may be made separately and securely fastened to the under side of said plate 5, or it may be, as shown in Fig. 5, cast in one piece with said plate. Upper section 10 10 of the fifth wheels rests upon the bearing surfaces or lower sections 11 11 of the fifth wheels. This latter also forms a segment of a circle and is cast as part of the horizontal plate 12, as shown, or the lower section 11 of the fifth wheels may be made separately and securely fastened to said plate 12. Lower plates 12 12 are provided with proper bearings for the king bolts 9 9, or obviously the king bolts themselves may be cast as a single piece with plates 12 12 without departing from the spirit of my invention. Plates 12 12 are rigidly fastened at one edge thereof in horizontal position to axles 13 13, and they extend inward toward the middle of the body of the vehicle for accommodation of the king bolts 9 9—so that the position of the king bolt for each axle is inward toward the middle of the body of the vehicle relatively to the position of the axles. The plates 12, 12 are provided with outwardly extending lugs which are clamped to the axles by means of clips as plainly shown in Figs. 2, 3 and 4. By extending the lugs outwardly the plates 12, 12 are more rigidly secured.

14 14 14 14 are four angle braces (Fig. 2), which extend from the inward portion of horizontal plates 12 12 and are secured to the outer portion of each axle, as shown, for support of the said plates 12 12. These braces 14 14 14 14 also serve to brace the axle itself against bending. At each end of each axle are the wheels 15 15.

As thus far described, obviously the axles are permitted the motion illustrated by the dotted lines in Fig. 2 so that when the vehicle is rounding a corner as the forward axle assumes the position substantially on a radius of the curve, the rear axle may assume a similar position substantially on another radius of the same curve, and thus the rear wheels may follow substantially in the tracks made by the forward wheels. So obviously with the king bolts placed at a distance from the axle toward the middle of the body of the vehicle, each axle is permitted a greater range of motion and the wheels may be cramped nearer together as permitted by the position of the body of the vehicle relative to the axles, than in the ordinary construction where the king bolt is placed immediately over the middle of the axle. To control and compel this motion I provide (Figs. 3, 4 and 5) curved inclined racks 16 16, one on the upper surface of each plate 12 12 and corresponding beveled pinions or gears 17 17, one on each end of the horizontal shaft 18—one of said pinions being adapted to each of said racks and the said racks being placed concentric with the center of each king bolt 9 9. The horizontal shaft 18 is properly supported on upper horizontal plates 5 5 by means of bearings 27 27, which in this illustration of my device are formed in one casting with said plates 5 5, or for other support of said horizontal shaft 18, I may provide bearings 28 28, suitably attached to reaches 7 7, as shown (Figs. 2 and 4). Racks 16 16 are, as shown, placed between the ends of the lower section 11 of the fifth wheel and they are of such thickness as to be elevated above the level of said lower section 11 of the fifth wheel. As shown, they are cast in one piece with said plate 12, or racks 16 16 may be made in a separate piece and securely fastened to each of said plates 12 12. Racks 16 16 with their pinions 17 17 may be otherwise disposed than as here shown. It is preferred, however, that they be located at opposite sides of said two king bolts respectively.

The operation of the parts is as follows: If the axle at the left of Fig. 2 be turned to position as indicated by the dotted lines in that figure, pinion 17 at the left of Fig. 2 will be turned in the direction of the hands of a clock. Pinion 17 at the right of Fig. 2 will be turned in the same direction and will operate upon rack 16 at the right of said figure and cause the axle at the right side of the figure to assume the position indicated by the dotted lines shown in said figure. So also if the axle at the left were turned in the opposite direction, pinion 17 at the left will be caused to revolve in direction opposite the hands of a clock. Pinion 17 at the right of the drawing (Fig. 2) will then cause the right axle shown in said figure to assume the corresponding angle. Thus in whichever direction the vehicle turns in traveling both axles are caused to assume positions substantially radial to the arc of the curve around which the turn is being made, and this curve may be of a lesser diameter in view of the position of the king bolts as described, than in case where the king bolts are placed immediately over the middle of the two axles respectively.

Where it is desired to prevent too wide a range of motion in the axles when the vehicle is turning or in other words to prevent the wheels from hitting the wagon body, I provide at or near the ends of the lower section 11 of the fifth wheel on plate 12, stops 19 19 of rubber or other material shown in Figs. 2 and 4, which are secured to said plate 12, and are of sufficient thickness to contact with the end of the upper section 10 of the fifth wheel on plate 5; or I may provide in any given construction that the thickness of the racks 16 16 and their elevation above the level of the under section of the fifth wheel 11 shall be sufficient to cause the opposite ends of said racks 16 16 respectively to operate as stops when the axle is turning in either direction, by contact of either of said ends respectively with the corresponding ends of the upper fifth wheels 10 depressed as they are below the surface of plate 5. Or obviously I may place the stops in any other position on the vehicle than that described and I do not limit myself to any particular position for said stops, it being preferable, however, in my construction that the wheels shall not contact with the body of the vehicle in turning.

Referring now to Figs. 7 and 8, in order to enable the turning of the vehicle from within the body thereof, I provide on horizontal shaft 18 pinion 20, which is adapted to and in mesh with worm 21 on controller rod 22. Controller rod 22 is suitably mounted in bearings 23 23, which are supported on one of the reaches 7 7. Controller rod 22, as shown in Fig. 1, passes through the floor of the vehicle and extends upward to a suitable height where it is provided with a hand wheel 24. To guard against interference with the operation of the controller rod where it passes through the floor of the vehicle, owing to the action of the springs or otherwise—I have provided the flange ring 25 secured to the floor of the vehicle through which controller rod 22 passes. Within the flange ring 25 and between it and controller rod 22 is the ring 26 movably and pivotally supported in flange ring 25 as shown in section in Fig. 8. The controller rod 22 passes loosely through the pivoted ring 26. Obviously any other means may be employed to guard the controller rod against friction or binding due to vibration of the body of the vehicle by the operation of the springs or otherwise and I do not confine myself to the particular construction here shown. By turning the hand wheel 24 rotary motion of the controller rod 22 is conveyed to horizontal shaft 18. The pinions at each end of said shaft operate simultaneously on both racks and both the forward and rear axles are at the same time caused to assume any desired corresponding angle in view of the operation of parts above described. By this means the steering of the vehicle is controlled from within the body thereof. Obviously other means than those here shown may be employed whereby either hand or other power exercised from within the vehicle may be communicated to cause both axles to assume corresponding angles at the same time, and I do not limit myself to the particular construction here shown.

Where it is desired to steer the vehicle by power applied to either axle wheel 24, controller rod 22 and its connecting parts may be dispensed with and obviously from the construction here shown the turning of one axle will compel the turning of the other axle in manner so that the two axles will assume position substantially radial to the same curve and the wheels will substantially follow the same track in turning, and I therefore do not limit myself to a construction in which the power to steer the vehicle is applied from within the vehicle body.

In vehicles of this class in which the rear axle is given a pivotal movement relative to the body, it becomes important to consider the distribution of the load upon the fifth wheels. In order that side stresses due to the load, and other unnatural stresses, may be removed from the king bolt so that the king bolt will only have upon it the normal pulling stress, I provide the fifth wheels with bearing surfaces at points diametrically opposite the king bolts. To do this I extend the segmental tracks 10 of the upper plate to form a semicircle and the segmental tracks 11 of the lower plates far enough so that all of the tracks 10, 10 will at all times bear upon some part of tracks 11, 11.

I do not desire to be limited to the exact details shown and described, but

Having thus fully and clearly described my invention, what I claim and desire to secure by Letters Patent, is:—

1. In a vehicle, the combination of front and rear axles, a plate on each axle, a rack on each of said plates, a longitudinal frame provided with plates one each of which bears upon one of the first mentioned plates, means for pivoting together the said plates, that bear upon one another, together, a shaft provided with gears for engaging said racks and bearings on said second mentioned plates and on said frame for said shaft in close proximity to said gears.

2. In a vehicle, the combination of front and rear axles, a plate secured to one of said axles, a rack on said plate, a frame extending lengthwise of the body of the vehicle, a plate on said frame arranged to bear on said first mentioned plate, means for rotatively connecting said plates together, a shaft extending longitudinally and provided with a gear for engaging said rack and a bearing for said shaft in close proximity to said gear, said bearing being secured upon the plate on said frame.

3. In a vehicle, the combination of front and rear axles, a plate on each axle, a rack on each of said plates, a longitudinal frame provided with plates one each of which bears upon one of the first mentioned plates, means for pivoting together the said plates, which bear upon one another, a shaft provided with gears for engaging said racks and bearings for said shaft in close proximity to said gears, said bearings being secured to the plates on said frame.

4. In a vehicle, the combination of a front and rear axle, a plate secured to each of said axles, a rack on the upper side of said plates, a longitudinal frame provided with plates, one each of which bears upon each of said first mentioned plates, means for rotatively mounting said plates, the axis being at points distant from the axles, a shaft provided with gears for engaging said racks and extending over said racks.

5. In a vehicle, the combination of front and rear axles, a plate extending inwardly from each of said axles, braces extending from said plates to the outer portion of said axles, a longitudinal frame provided with plates, one each of which bears upon one of the first mentioned plates, means for rotatively connecting the plates at each axle together, and a shaft provided with gears for engaging racks on said first mentioned plates.

6. In a vehicle, the combination of the front and rear axles, a plate on each of said axles extending inwardly therefrom, said plates being provided with racks on their upper surfaces, a rigid frame extending lengthwise of the vehicle, a plate substantially at each end of said frame for bearing upon said first mentioned plates, means for rotatively mounting said axle plates to said frame plates, the axes being at points between the axles, a shaft extending lengthwise of the vehicle and provided with gears for engaging said racks, and bearings for said shaft outside of said gears, said bearings being secured to said frame plates.

7. In a vehicle, the combination of front and rear axles, a plate secured to each of said axles, a frame extending lengthwise of the vehicle, plates on said frame, one of each of which is adapted to bear upon one of said first mentioned plates, means for rotatively mounting the plates at each axle, relatively to each other, the axes of rotation being between the axles, racks on said first mentioned plates located inside of and between said axes, and a shaft provided with gears for engaging said racks.

8. In a vehicle, the combination of front and rear axles, a plate on one of the axles provided with a rack, a frame extending lengthwise of the vehicle, a plate on said frame arranged to bear upon said first mentioned plate, a shaft rotatively mounted on said frame and provided with gears one of which engages said rack, a second shaft passing through the bottom of the vehicle for rotating said first mentioned shaft and a bearing loosely and movably mounted in the body of the vehicle for said second mentioned shaft.

9. In a vehicle, the combination of front and rear axles, a plate on one of said axles provided with a rack, a second plate arranged to bear upon said first mentioned plate and secured to a frame, said last mentioned plate extending only partway over said first mentioned plate to admit of placing the rack on the upper part of said first mentioned plate, and a shaft provided with a beveled gear for engaging said rack.

10. In a vehicle, the combination of front and rear axles, a plate extending inwardly from each of said axles, a brace extending from the plate on the rear axle to the outer portion of the rear axle, a longitudinal frame provided with plates, one each of which bears upon one of the first mentioned plates, means for rotatively connecting together the plates at each axle, and a shaft provided with gears for engaging racks on said first mentioned plates.

11. In a vehicle the combination of front and rear axles, a plate on each axle extending inwardly therefrom, said plates being provided with racks on their upper surfaces, a frame extending lengthwise of the vehicle, a plate substantially at each end of said frame for bearing upon said first mentioned plates, means for rotatively mounting said axle plates to the frame plates, the axes being at points between the axles, a shaft extending lengthwise of the vehicle and provided with pinions for engaging said racks, and bearings for said shaft outside of said pinions.

12. In a vehicle the combination of front and rear axles, a plate secured to one of said axles, a rack secured to said plate, a frame extending lengthwise of the body of the vehicle, a plate on said frame arranged to bear on said first mentioned plate, means for rotatively connecting said plates together, curved tracks on said plates, having bearing surfaces at diametrically opposite points with respect to the axis of rotation of said plates, a shaft extending longitudinally and provided with a pinion for engaging said rack, and a bearing for said shaft secured upon the plate on said frame.

13. In a vehicle, the combination of front and rear axles, a plate secured to one of said axles, a rack on said plate, a frame, a plate on said frame arranged to bear on said first mentioned plate, means for rotatively connecting said plates together, a shaft extending longitudinally and provided with a pinion for engaging said rack and a bearing for said shaft secured on the plate on said frame.

14. In a vehicle, the combination of front and rear axles, a plate secured to each of said axles, a frame, plates on said frame, one each of which is adapted to bear upon one of said first mentioned plates, means for rotatively mounting the plates at each axle relatively to each other, the axes of rotation being between the axles, racks on said first mentioned plates located inside of and between said axes, curved tracks for said plates having bearing surfaces at points diametrically opposite said axes of rotation, and a shaft provided with pinions for engaging said racks.

15. In a vehicle, the combination of front and rear axles, a plate secured to one of said axles, a frame extending lengthwise of the body of the vehicle, a plate on said frame arranged to bear on said first mentioned plate, means for rotatively connecting said plates together, the axis being at a point distant from the axle upon which said first mentioned plate is secured, a curved track on one of said plates having bearing surfaces at points diametrically opposite said axis, a shaft, a gear on said shaft, and a bearing for said shaft in close proximity to said gear.

16. The combination with the front and rear axles of a vehicle, a plate on each axle, a rack on top of each of said plates, a frame provided with plates, one each of which bears upon one of said first mentioned plates, kingbolts for said plates, curved tracks on said plates having bearing surfaces at diametrically opposite points with respect to said king-bolts, and a shaft provided with pinions for engaging said racks.

17. The combination with the front and rear axles of a vehicle, of a plate secured to each axle, a frame, plates on said frame, one each of which is adapted to extend over one of the plates on said axles, means for rotatively connecting the plates at each axle together, curved tracks on said plates, portions of said tracks having bearing surfaces over the axles, and bearing surfaces at diametrically opposite points with respect to the axis of said plates, and gears over said axle plates and mechanically connected for operating said plates.

18. The combination with the front and rear axles of a vehicle, of a plate secured to each axle, a frame, plates on said frame, one each of which is adapted to extend over one of the plates on said axles, means for rotatively securing the plates at each axle together, curved tracks for said plates having bearing surfaces at points diametrically opposite the axes of rotation, gears mechanically connected for operating said plates, lugs extending outwardly from said first mentioned axle plates and means for securing said lugs to said axles.

JOHN M. EADIE.

Witnesses:
JAMES G. K. LEE,
ALICE M. BROWN.